United States Patent
Fickeisen et al.

(10) Patent No.: US 9,863,102 B2
(45) Date of Patent: Jan. 9, 2018

(54) BUILDING MACHINE WITH LIFTING DEVICE FOR A CHARGING PROCESS

(71) Applicant: JOSEPH VOEGELE AG, Lugwigshafen/Rhein (DE)

(72) Inventors: Steffen Fickeisen, Bad Duerkheim (DE); Tobias Elser, Mosbach (DE)

(73) Assignee: JOSEPH VOEGELE AG (DE)

( * ) Notice: Subject to any disclaimer, the term of this patent is extended or adjusted under 35 U.S.C. 154(b) by 7 days.

(21) Appl. No.: 15/147,962

(22) Filed: May 6, 2016

(65) Prior Publication Data

US 2016/0326702 A1 Nov. 10, 2016

(30) Foreign Application Priority Data

May 6, 2015 (EP) .................................... 15166629

(51) Int. Cl.
*B60P 1/26* (2006.01)
*E01C 19/48* (2006.01)
*E01C 19/12* (2006.01)

(52) U.S. Cl.
CPC ............... *E01C 19/48* (2013.01); *B60P 1/26* (2013.01); *E01C 19/12* (2013.01); *E01C 2301/02* (2013.01); *E01C 2301/04* (2013.01); *E01C 2301/08* (2013.01)

(58) Field of Classification Search
CPC .. E01C 19/22; E01C 2301/02; E01C 2301/24; E01C 2301/08; E01C 2301/04; B60P 1/26
USPC .................. 404/108, 110; 414/334, 335, 339
See application file for complete search history.

(56) References Cited

U.S. PATENT DOCUMENTS

| 3,034,410 A | * | 5/1962 | Ross | E01C 19/15 404/108 |
| 4,955,754 A | * | 9/1990 | Smith | B60D 3/00 293/134 |
| 5,100,277 A | * | 3/1992 | Musil | E01C 19/48 404/108 |
| 5,197,848 A | * | 3/1993 | Musil | E01C 19/48 414/809 |
| 2010/0326067 A1 | | 12/2010 | Weiser et al. | |
| 2015/0292592 A1 | | 10/2015 | Petersmann | |

FOREIGN PATENT DOCUMENTS

EP 2930270 A1 10/2015

OTHER PUBLICATIONS

European Search Report dated Oct. 7, 2015, Application No. EP 15 16 6629,3 Pages.

* cited by examiner

*Primary Examiner* — Gary Hartmann
(74) *Attorney, Agent, or Firm* — Brooks Kushman P.C.

(57) ABSTRACT

An automotive building machine comprising a material bunker for accommodating therein pavement material to be laid is provided, the building machine being a road finisher or a charger. The material bunker comprises at least one lifting device, which is adapted to enter into releasable engagement with a movable tailgate of a truck supplying the material bunker with the pavement material and which is configured for displacing the movable tailgate of the truck between a first position and a second position. A method used for this purpose is also provided.

17 Claims, 9 Drawing Sheets

BUILDING MACHINE WITH LIFTING DEVICE FOR A CHARGING PROCESS

CROSS-REFERENCE TO RELATED APPLICATIONS

This application claims foreign priority benefits under 35 U.S.C. §119(a)-(d) to European patent application number EP 15166629.4, filed May 6, 2015, which is incorporated by reference in its entirety.

TECHNICAL FIELD

The present disclosure relates to an automotive building machine with a material bunker comprising a lifting device. In addition, the disclosure relates to a method of shifting a movable tailgate of a truck.

BACKGROUND

It is known that, during a charging process, a material supply vehicle, e.g., a truck, backs up to a material bunker of a road finisher or a charger and, if necessary, docks onto a docking device of the road finisher or of the charger, at least temporarily, during the charging process. A docking device provided for this purpose is furnished e.g., by the applicant's PaveDock system, which is described especially within the framework of European patent application No. 14164376.7, whose disclosure is herewith incorporated by reference.

For filling the material bunker of the road finisher or of the charger, the material supply vehicle, e.g., the truck, backs up to the material bunker such that the rear part of the load platform of the material supply vehicle projects, at least partially, into a charging area of the material bunker, so that, when the load platform is tilted, the pavement material will slide from the load platform into the material bunker.

Traditionally, the load platform of the material supply vehicle comprises a tailgate, which is opened during the material transfer process to the material bunker, when the material supply vehicle tilts the load platform. When the load platform of the material supply vehicle is being lifted, the tailgate is maintained at a position enforced by gravity substantially perpendicular to the ground, and it may additionally be forced open backwards by the pavement material sliding down the load platform.

A circumstance causing problems is that, when the material is being transferred, the tailgate of the truck projects far into a charging area of the material bunker of the road finisher or of the charger and may perhaps collide with material bunker walls or with components, such as augers, installed in the material bunker.

In addition, the hanging-down tailgate may prevent a uniform distribution of material during material transfer to the material bunker of the road finisher or of the charger, since the pavement material sliding down the load platform strikes against the tailgate and is then guided predominantly into a front area of the material bunker. This results in non-uniform filling of the material bunker, whereby additional efforts may be required or the laying process may even be interrupted.

SUMMARY

It is an object of the present disclosure to provide a building machine with a material bunker, which, making use of simple technical means, prevents parts of the load platform of the material supply vehicle from colliding with the material bunker, in particular with the components installed therein, during a material transfer process. In addition, it is the object of the present disclosure to allow the material bunker to be filled uniformly with material. Furthermore, it is the object to provide a suitable method for this purpose.

The subject matter of the disclosure is an automotive building machine comprising a material bunker for accommodating therein pavement material to be laid, the building machine being a road finisher or a charger (i.e., charger vehicle). According to the present disclosure, the material bunker comprises at least one lifting device, which is adapted to enter into releasable engagement with a movable tailgate of a truck supplying the material bunker with the pavement material and which is configured for displacing the movable tailgate of the truck between a first position and a second position.

The lifting device of the material bunker can thus prevent the tailgate of the truck supplying the material bunker with pavement material from colliding with the material bunker, in particular with the side walls thereof and/or with components installed in the material bunker, e.g., transverse augers.

Due to the fact that the lifting device is provided directly on the material bunker of the road finisher or of the charger and is configured for releasably taking hold of any tailgate of a truck, the lifting device can be used for lifting the tailgate of various trucks. Hence, the road finisher or the charger according to the present disclosure can be used flexibly for a variety of material supply vehicles, without being limited to a specific type of material supply vehicle.

Up to now, the tailgate hung down, so to speak, freely, and in particular uncontrolledly, into the charging area of the material bunker of the road finisher or of the charger, and it happened quite often that, due to the pavement material sliding down the load platform of the material supply vehicle, the tailgate swung abruptly backwards and knocked against the material bunker and in particular against components installed therein, thus causing expensive damage to the material bunker. Such damage can be avoided by the present disclosure, since, making use of the lifting device according to the disclosure, the tailgate of the truck can be displaced in the course of a controlled movement between a first position, at which it still projects into the charging area of the material bunker to a substantial extent, and a second position, at which it has been moved out of the charging area of the material bunker to a substantial extent. A collision between the tailgate and the material bunker, in particular the side walls of the latter and/or the components installed therein, is therefore no longer possible.

Preferably, the lifting device comprises a linear drive configured for bringing the lifting device into engagement with the movable tailgate of the truck as well as for releasing the lifting device from the movable tailgate. The term linear drive means here a drive system leading to a translational movement. In particular, the linear drive allows a movement of the telescopic arm of the lifting device, which will be described hereinbelow, along a straight line. The linear drive can be secured in position on the material bunker in a space-saving manner together with other components of the lifting device. The linear drive may, e.g., comprise a hydraulic cylinder, a pneumatic cylinder, an electrical linear drive, a mechanical linear drive and/or an electromechanical linear drive. Such components are robust and easy to operate and they can easily be secured to the material bunker of the road finisher or of the charger.

According to an advantageous embodiment of the disclosure, the lifting device comprises a pivot drive configured for pivoting the movable tailgate of the truck between the first position and the second position. By way of example, the pivot drive comprises an electric motor including a drive shaft, which has secured thereto the pivot arm of the lifting device described hereinbelow. Making use of the pivot drive, the lifting device according to the present disclosure is able to guide the tailgate of the truck in a controlled manner between the first position and the second position, so that uncontrolled abrupt swinging movements of the tailgate can be avoided.

It will be particularly advantageous when the lifting device can be operated electrically, hydraulically, pneumatically and/or mechanically for taking hold of and/or displacing the tailgate of the truck. It is possible that the lifting device, in particular the linear and/or pivot drive belonging thereto, is connected to an electrical, hydraulic and/or mechanical drive system of the road finisher or of the charger, which is connected to the lifting device e.g., via the material bunker. Due to the fact that the lifting device is functionally connected to electrical, hydraulic and/or mechanical components that are already provided on the road finisher or on the charger, the overall installed size of the lifting device is small, so that the lifting device itself occupies little space on the material bunker. In addition, manufacturing costs can be saved in this way. Alternatively, the lifting device according to the present disclosure may be configured in an at least partially independent manner, i.e., electrical, hydraulic and/or mechanical components for executing one or a plurality of the movements of the lifting device, especially for the purpose of taking hold of and/or displacing the tailgate of the truck, are comprised, at least partially, in the lifting device. Hence, the lifting device could easily be used for retrofitting a material bunker of a road finisher or of a charger.

Preferably, the lifting device is controllable automatically and/or manually. The term automatic control means that, also without active intervention on the part of the operator of the road finisher or of the charger, the lifting device will take hold of the tailgate of the truck and move the same between the first and the second position. For this kind of use, it is imaginable that the lifting device and/or the road finisher or the charger include a detection unit configured for detecting the tailgate of the truck, when said tailgate is at the first position, and that, on the basis of this detected information, the lifting device moves to an engagement position at the tailgate of the truck and displaces said tailgate then from the first position to the second position. Preferably, pivoting back of the tailgate by means of the lifting device could then be executable automatically, when the detection unit detects that the load platform of the truck tilts backwards.

However, the shifting of the lifting device to the position of engagement for the purpose of taking hold of the tailgate of the truck at the first position may also be functionally coupled with some other system of the road finisher or of the charger. For example, the lifting device could be configured for being functionally connected to the PaveDock system referred to at the beginning in connection with the prior art. In this case, the lifting device may receive from the PaveDock system an activation signal, which indicates that the truck has docked onto the PaveDock system of the road finisher or of the charger and that the tailgate of the truck hangs into the charging area of the material bunker such that the lifting device can dock onto the tailgate of the truck for lifting it from the first position to the second position. The activation signal can here initiate a predetermined sequence of motions of the lifting device, on the basis of which the lifting device engages an area of the tailgate, in particular an inner surface of the tailgate, and transfers the tailgate then from the first position to the second position. Such a sequence of motions could preferably be realized from a control unit provided e.g., in the control panel of the building machine. The automated variant can advantageously be used for all road finisher and charger models, in particular for those offering to the operator on the operator's stand of the road finisher or of the charger only limited viewing conditions as regards the interior of the material bunker.

Manual control of the lifting device means that an operator will actively initiate and execute the sequence of motions of the lifting device described hereinbefore in connection with the automatic control as soon as the tailgate of the truck has been appropriately oriented relative to the lifting device at the first position. In this context it is imaginable that, for manually controlling the lifting device, the lifting device itself has provided thereon at least one control element that can be activated by an operator standing next to the material bunker. Alternatively or additionally, it would, however, also be possible to provide at the operator's stand, e.g., on the control panel of the road finisher or of the charger, at least one control element for functionally controlling the lifting device, said control element being adapted to be used by an operator of the road finisher or of the charger for functionally controlling, from the operator's stand, the lifting device provided on the material bunker.

According to another variant, the lifting device has associated therewith a remote control unit, which the operator can carry with him. During the material transfer process, the operator can position himself laterally in front of the material bunker, so as to have a good view into the charging area of the material bunker. From this position, he can control the sequence of motions of the lifting device by means of the remote control unit as well as give signals to the truck driver and/or the operator of the road finisher or of the charger, if necessary.

It is also imaginable that, according to a variant of the disclosure, a sequence of motions of the lifting device concerning the tailgate of the truck can be learned by a control device of the road finisher or of the charger. The control device may in particular be configured to learn stopping and turning points of the lifting device with respect to the tailgate of a truck and store them as a sequence of motions for the lifting device and retrieve them, when the respective truck has again be positioned on the road finisher or the charger for a transfer of material. The retrieval of the sequence of motions can here be initiated automatically or manually.

According to another advantageous embodiment of the disclosure, the lifting device comprises a bearing unit, a pivot arm rotatably secured thereto and a telescopic arm, which is secured to the pivot arm such that it is displaceable between an extended and a retracted position. The bearing unit is especially configured for being secured to a side wall of the material bunker. It would also be imaginable that the bearing unit comprises the above described linear and/or pivot drive and is configured for pivoting the pivot arm secured to the bearing unit and/or for linearly shifting the telescopic arm.

According to an embodiment, the bearing unit may additionally support the detection unit described hereinbefore in connection with the automatic control of the lifting device, the bearing unit defining a stable base for the detection unit.

The lifting device can be secured to a side wall of the material bunker in a particularly stable manner, when parts of the bearing unit are mounted to the inner and outer surfaces of the side wall of the material bunker.

The pivot arm and the telescopic arm preferably define, at least partially, the above described linear drive, the telescopic arm being preferably supported such that it is displaceable in a tube section of the pivot arm. The telescopic arm can here be moved into or out of the tube section of the pivot arm for the purpose of positioning relative to the tailgate of the truck, i.e., for docking onto the tailgate of the truck or for disengagement from the tailgate of the truck.

In order to allow the telescopic arm to enter into force-fit engagement with the tailgate of the truck, a holding element, which is adapted to couple to the tailgate of the truck, is provided preferably on an extendable end of the telescopic arm. The holding element may e.g., be a lever arm projecting from the telescopic arm inwards into the charging area of the material bunker, said lever arm being adapted to be coupled to an inner surface of the tailgate when the telescopic arm is being retracted into the pivot arm.

A particularly good location for securing the lifting device in position is an upper edge of a side wall of the material bunker. At this point, the lifting device is easily accessible and can be secured to the material bunker in a space-saving manner, without interfering with the other components installed in the material bunker. In addition, this is a location from which the tailgate of the truck hanging into the charging area of the material bunker can be taken hold of extremely easily and moved from there to the second position. By securing the lifting device to the upper edge of the side wall, displacement distances travelled by the lifting device for moving the tailgate of the truck can be reduced.

In addition, it would be advantageous if each of the two side walls of the material bunker had secured thereto a respective lifting device. These lifting devices may preferably be moved in synchronism with each another, so that they will simultaneously enter into engagement with the tailgate of the truck, lift said tailgate synchronously from the first position to the second position, and allow a synchronous lowering of the tailgate from the second position back to the first position. The use of two lifting devices on the material bunker will especially make sense if the tailgate to be lifted should be very heavy, as will normally be the case.

Preferably, the lifting device is releasably secured to the material bunker, e.g., fixed thereto by means of screws. Thus, the lifting device can easily be removed from the material bunker, especially for the purpose of maintenance. Likewise, it can thus easily be added to the material bunker of a road finisher or a charger for the purpose of retrofitting the same.

It will be particularly advantageous when the lifting device is configured for holding the tailgate outside a charging area of the material bunker, when the tailgate occupies the second position. This will be possible especially in the event that the pivot drive of the lifting device is operable such that it is able to pivot the pivot arm of the lifting device up to and into an area that is spaced apart between 90° and 160° from the starting position. Thus, it is achieved that, by means of the lifting device, the tailgate can be positioned above and outside of the material bunker at the second position such that it will no longer hang into the charging area, i.e., the area in which the material bunker receives the pavement material. A collision with the material bunker can then no longer take place.

The present disclosure also relates to a method of shifting a movable tailgate of a truck positioned on a material bunker of a road finisher or of a charger for the purpose of transferring pavement material. According to the present disclosure, a lifting device, which is provided on the material bunker of the road finisher or of the charger, docks onto the tailgate of the truck when said tailgate occupies a first position. At said first position, the tailgate hangs, at least partially, into a charging area of the material bunker and, through tilting up the load platform of the truck, the tailgate may be moved even further into the charging area of the material bunker, which may possibly entail the risk of a collision with other components provided in the interior of the material bunker.

According to the present disclosure, the tailgate is therefore moved by the lifting device from the first position to a second position, at which the tailgate has, at least partially, been moved out of a charging area of the material bunker, the tailgate being held by the lifting device at said second position at least temporarily. At the second position, the tailgate of the truck is held by the lifting device such that it can no longer collide with the material bunker, especially not with the components provided therein. Preferably, the tailgate of the truck remains at the second position until the material bunker of the road finisher or of the charger has been filled completely.

Preferably, the lifting device moves the tailgate from the second position back to the first position. This is preferably done simultaneously with a tilting-in movement of the load platform of the truck, so that the tailgate will not under any circumstances collide with the material bunker and the components provided therein. During the sequence of motions of the lifting device, carried out for reliably moving the tailgate from the first position to the second position and back to the first position, the tailgate of the truck carries out a controlled movement, which is allowed through the use of the lifting device. Abrupt swinging out of the tailgate of the truck against the material bunker can be prevented in this way.

Preferably, the lifting device is released from the tailgate of the truck in that, at the end of the charging process, the truck briefly holds the load platform at a slightly tilted position, at which the tailgate preferably occupies the first position. The lifting device can then easily be moved away from the inner surface of the tailgate, so that it will no longer abut on the tailgate.

Preferably, the lifting device is displaced by means of a linear drive for docking onto the tailgate of the truck. This linear drive can be implemented as described hereinbefore. According to a further embodiment of the present disclosure, the lifting device is displaced by means of a pivot arm, which can be implemented as described above, for moving the tailgate between the first and the second position.

In addition, it is possible that the sequence of motions of the lifting device, carried out for reliably moving the tailgate from the first position to the second position and back to the first position, can be learned, i.e., stored, by a control device of the road finisher or of the charger and can be retrieved in the case of a renewed transfer of material, especially a transfer from the same type of truck. The sequence of motions can be retrieved either automatically or manually. In particular, the sequence of motions can be retrieved manually, by pushing a button, at the operator's stand of the road finisher or of the charger. It is also imaginable that the sequence of motions can be retrieved at a screed control station of the road finisher. Furthermore, it is imaginable that the sequence of motions can be retrieved automatically through a docking process of the truck onto the road finisher or the charger.

In the following, embodiments according to the present disclosure will be explained in more detail making reference to the attached drawings.

BRIEF DESCRIPTION OF THE DRAWINGS

Like components are provided with like reference numerals throughout the figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
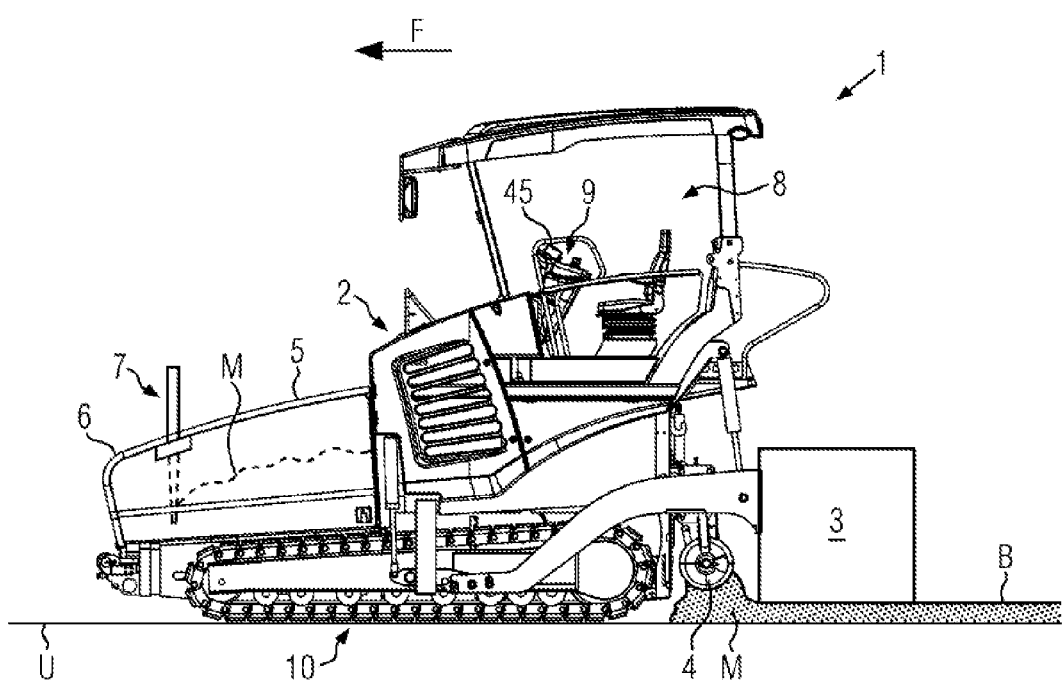
FIG. 1 is a side view of a road finisher according to the present disclosure.

FIG. 1 shows a side view of an automotive building machine 1, which is a road finisher 2 in the present embodiment. The road finisher 2 moves on the ground U in a laying direction F. The road finisher 2 comprises a screed 3 which applies a new pavement layer B to the ground U. In front of the screed 3, the road finisher 2 comprises an auger 4 distributing pavement material M ahead of the screed 3 when seen in the direction of movement F. Furthermore, the road finisher 2 comprises a material bunker 5 provided, when seen in the direction of movement F, at the front end of the road finisher 2 and configured for accommodating the pavement material M. From the material bunker, the pavement material M is conveyed via a longitudinal conveyor L, which is not shown in FIG. 1, (cf. FIG. 2) rearwards to the auger 4, by means of which it is then spread ahead of the screed 3.

A side wall 6 of the material bunker 5 has a secured thereto a lifting device 7. According to the present disclosure, the lifting device 7 is used for a material transfer process, which will be described hereinbelow especially in connection with FIGS. 4 to 10.

In addition, the road finisher 2 comprises an operator's stand 8 from which an operator can control a plurality of functions of the road finisher 2 by means of a control panel 9 provided at the operator's stand 8. In particular, the operator is able to control, via the control panel 9, functions of the material bunker 5 and of the lifting device 7 attached thereto. The control panel 9 comprises a control device 45 that is functionally coupled especially to an operation of the lifting device 7. The control device 45 is in particular configured for coordinating and possibly storing a sequence of motions of the lifting device 7.

The road finisher 2 shown in FIG. 1 comprises a crawler track drive 10, but the road finisher 2 may also be configured as a wheeled paver without departing from the present inventive idea.

Figure 2:
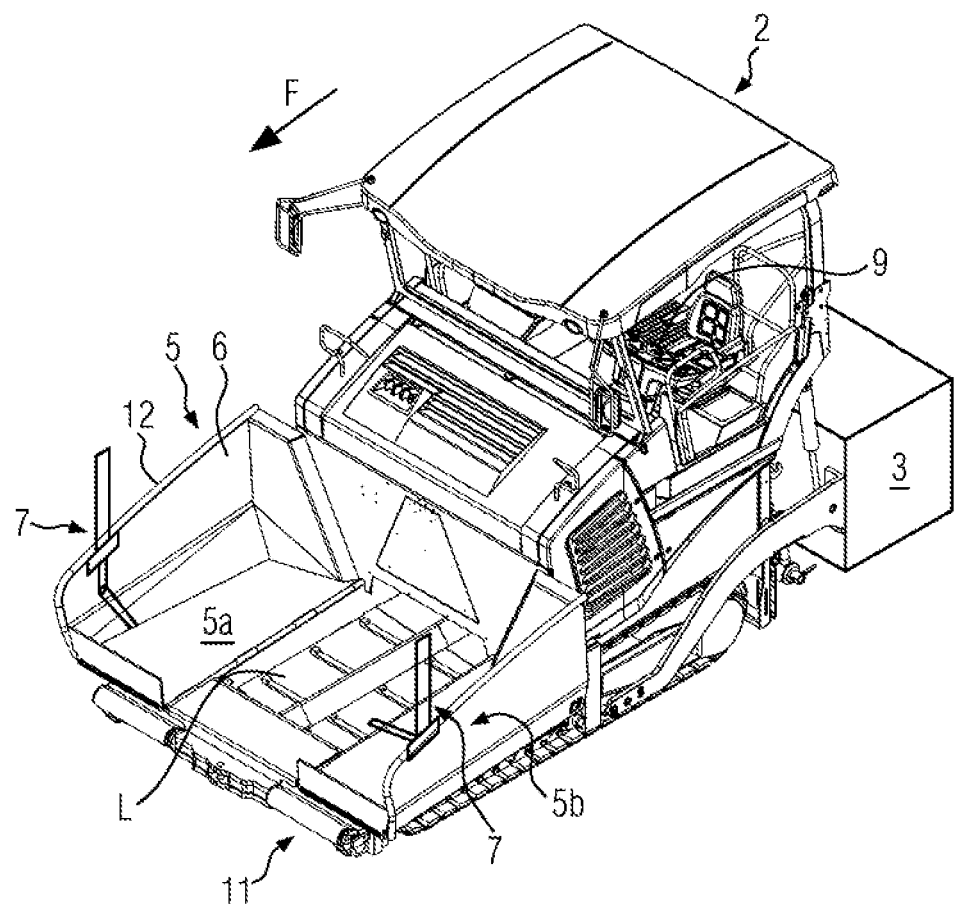
FIG. 2 is a perspective representation of the road finisher according to the present disclosure.

FIG. 2 shows the road finisher 2 depicted in FIG. 1 in a perspective view, which offers a good view into the material bunker 5 of the road finisher 2. The material bunker 5 preferably comprises two tiltable material bunker halves 5a, 5b. The longitudinal conveyor L extends between these material bunker halves 5a, 5b. By tilting the material bunker halves 5a, 5b inwards in the direction of the longitudinal conveyor L, pavement material M can be conveyed from the material bunker halves 5a, 5b in the direction of the longitudinal conveyor L. The longitudinal conveyor L conveys the pavement material M positioned thereon to the rear, passing it below the operator's stand 8 and advancing it to the screed 3.

In addition, FIG. 2 shows a pushing device 11 secured to the road finisher 2 below and in front of the material bunker 5, when seen in the direction of movement F. The pushing device 11 serves to dock onto the rear wheels of a truck A (cf. FIG. 4), when the truck backs up to the material bunker 5 of the road finisher 2 for a material transfer process. The pushing device 11 may be configured to push the truck A at least temporarily during the material transfer process ahead of the road finisher 2 at a constant distance from the material bunker 5.

In FIG. 2 it can also be seen that each of the two material bunker halves 5a, 5b has secured thereto a respective lifting device 7. Both lifting devices 7 are secured to an upper edge 12 of the respective side walls 6 of the material bunker halves 5a, 5b in a front area of the material bunker 5. Further details of the lifting device 7 are explained in connection with FIGS. 5 to 9.

Figure 3:
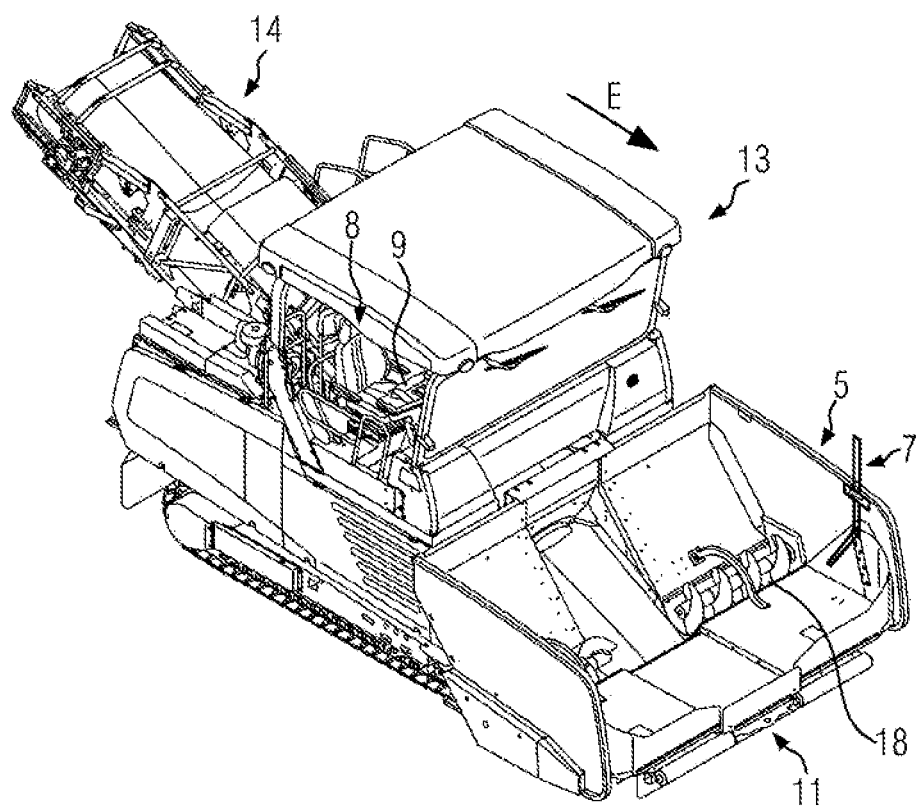
FIG. 3 is a perspective representation of a charger according to the present disclosure.

In FIG. 3, the automotive building machine 1 is a charger 13 for a road finisher. The charger 13 comprises a material conveyor 14, which has pavement material M supplied thereto from the material bunker 5 of the charger 13. The material conveyor 14 is configured for conveying pavement material M into the material bunker 5 of a road finisher 2 according to FIG. 1 travelling behind the charger 13. In the case of such an application, the road finisher 2 and the charger 13 preceding the same define a paving system in which pavement material M from the charger 13 is constantly available to the road finisher 2.

The material bunker 5 of the charger 13 has provided therein a transverse auger 18 on the base of the material bunker 5 transversely to the direction of movement E. The transverse auger 18 may be provided in each of the two material bunker halves 5a, 5b, irrespectively of whether the material bunker 5 belongs to the road finisher 2 or to the charger 13. The transverse auger 18 is used in the material bunker 5 for moving the pavement material M in the direction of the longitudinal conveyor L shown in FIG. 2, so that the pavement material M can be conveyed continuously out of the material bunker 5. FIG. 3 also shows that, like the road finisher 2 according to FIGS. 1 and 2, the charger 13 is provided with a pushing device 11 allowing a truck to dock thereonto during a material transfer process.

Although in FIG. 3 a lifting device 7 is secured to only one of the material bunker halves 5a, 5b of the material bunker 5 of the charger 13, a second lifting device 7 may just as well be secured to the other material bunker half 5a, 5b.

Figure 4:
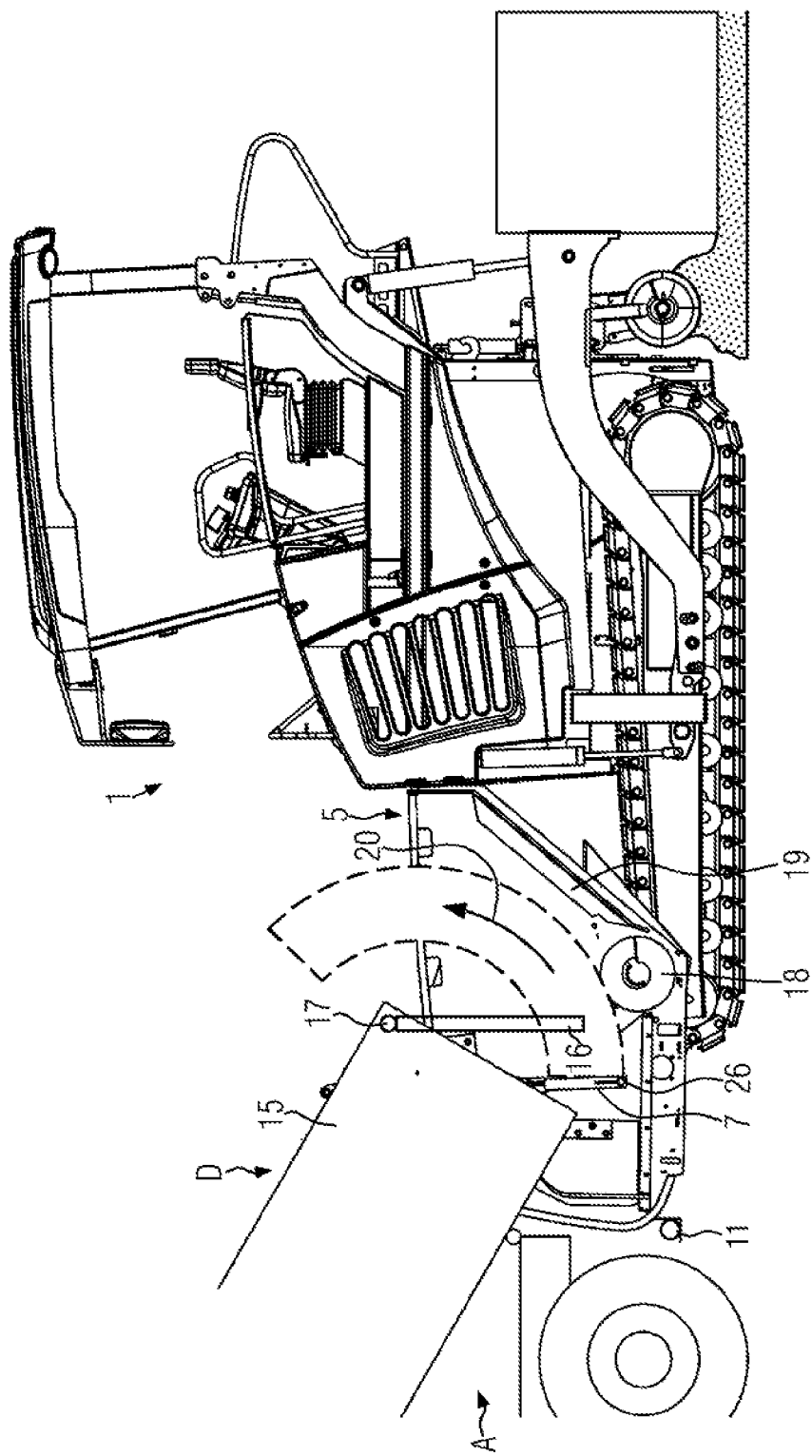
FIG. 4 is a charging process in the course of which pavement material is dumped from the load platform of a truck into the material bunker of a road finisher or of a charger according to the present disclosure.

FIG. 4 shows a material feed vehicle D, which is a truck A in the case of this embodiment. The truck A supplies the road finisher 2 according to FIG. 1 or the charger 13 according to FIG. 3 with pavement material M on site. For a material transfer process, the truck A is positioned in front of the material bunker 5 of the road finisher 2 or of the charger 13. In FIG. 4, the truck has docked onto the pushing device 11 of the building machine 1 with its rear tires. The truck A has a load platform 15 which is tilted for filling the material bunker 5 with pavement material M. For causing the pavement material M to drop from the load platform 15 into the material bunker 5, a tailgate 16 of the load platform 15 is opened. The tailgate 16 is supported such that it is rotatable about a rotary axle 17 on the load platform 15 of the truck A. Due to the force of gravity acting on the tail-gate 16, the latter tends to be oriented substantially perpendicular to the ground U during tilting of the load platform 15, irrespectively of the tilt angle of the load platform 15.

In FIG. 4, the transverse auger 18 provided on the base of the material bunker 5 is configured for conveying the pavement material M from one of the material bunker halves 5a, 5b in the direction of the longitudinal conveyor L. Problems may arise, if the pavement material M sliding down the load platform 15 of the truck A presses against the tailgate 16, so that the latter abruptly swings backwards and may thus possibly knock against the transverse auger 18. Such a collision causes damage especially to the transverse auger 18 of the material bunker 5, whereby high costs of repair may be incurred. FIG. 4 shows clearly that the open tailgate 16 projects widely into a charging area 19 of the material bunker 5 and that in particular the lower end of the latter extends almost down to the base of the material bunker 5. This, however, entails the risk that the tailgate may knock against the respective material bunker halves 5a, 5b of the material bunker 5 or collide with other components provided therein, e.g., with the above described transverse auger 18. In order to prevent this, the lifting device 7, only part of which is shown in FIG. 4, takes hold of the tailgate 16 and pivots it away from the charging area 19 along a pivoting direction 20. This process and further details of the lifting device 7 will be explained on the basis of the figures following hereinbelow.

Figure 5:
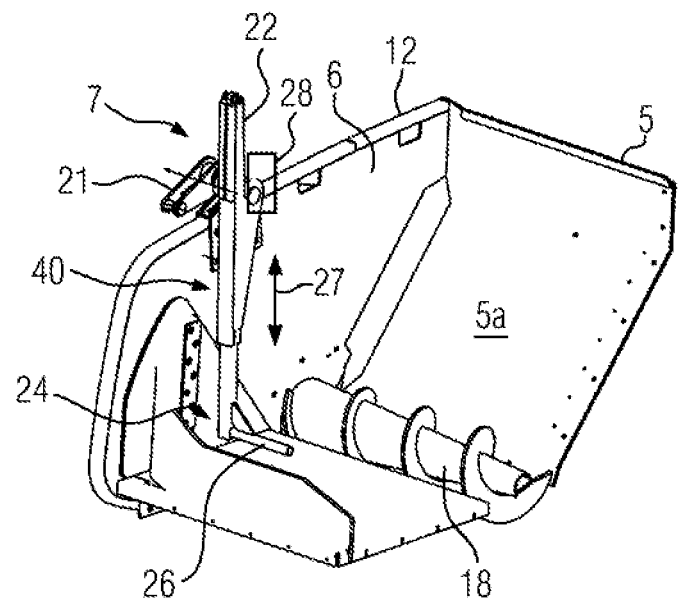
FIG. 5 is a material bunker arrangement according to the present disclosure, with a lifting device in an extended condition.
Figure 6:
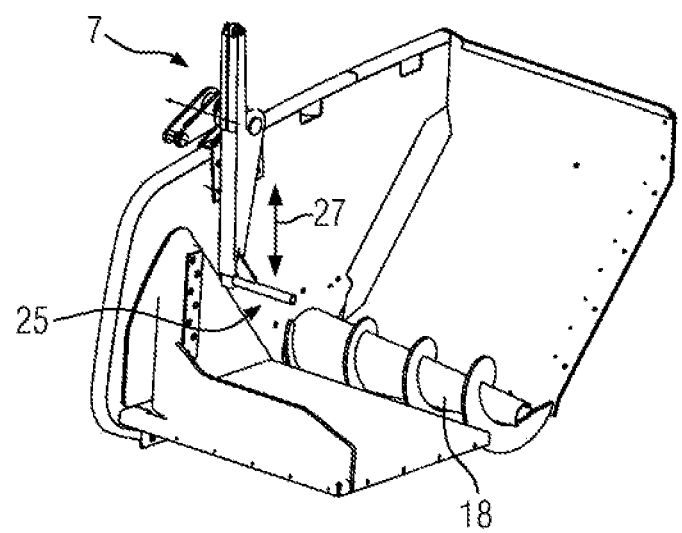
FIG. 6 is a material bunker arrangement according to the present disclosure, with a lifting device in a retracted condition.

FIG. 5 is a perspective view of one of the two material bunker halves 5a, 5b of the material bunker 5. According to FIG. 5, the lifting device 7 is secured to the upper edge 12 of the side wall 6 of the material bunker half 5a. The lifting device 7 comprises a bearing unit 21, which is secured in position on the upper edge 12 at a forward location of the side wall 6. The bearing unit 21 has rotatably secured thereto a pivot arm 22. The bearing unit 21 holds the pivot arm 22 in the interior of the material bunker half 5a, so that the pivot arm 22 is, opposite towards an inner side of the side wall 6, arranged in a rotatable manner.

In addition, the lifting device 7 comprises a telescopic arm 23, which secured to the pivot arm 22 such that it is displaceable between an extended and a retracted position 24, 25. FIG. 5 shows the telescopic arm 23 at the extended position 24.

A lower end of the telescopic arm 23 has provided thereon a holding element 26 for coupling to the tailgate 16 of the truck A in FIG. 5, the holding element 26 is an arm that projects from the telescopic arm 23 substantially orthogonally inwards towards the longitudinal conveyor L.

Making reference to the material transfer process according to FIG. 4, the tailgate 16 occupies, when seen in the direction of movement F or the laying direction E, a position behind the lifting device 7 of the material bunker 5 shown in FIG. 5, for executing a material transfer process. In order to enter into engagement with an inner side of the tailgate 16, the telescopic arm 23 moves in a linear direction 27 from the extended position 24 shown in FIG. 5 to the retracted position 25 shown in FIG. 6. This has the effect that the holding element 26 will no longer be positioned below the tailgate 16, as shown in FIG. 4, but is oriented towards an inner side of the tailgate 16. At the retracted position 25 according to FIG. 6, the holding element 26 can, when seen in the direction of movement F or the laying direction E, be oriented in front of the inner side of the tailgate 16, the holding element 26 being adapted to contact the inner side of the tailgate 16 already at the retracted position 25 or to be positioned at a predetermined distance from the inner side of the tailgate 16, so that the holding element 26 will contact the inner side of the tailgate 16 only when the pivot arm 22 pivots upwards.

FIG. 5 shows schematically that the lifting device 7 comprises a linear drive 28. The linear drive 28 is configured for moving the telescopic arm 23 along the linear direction 27 relative to the pivot arm 22. The linear drive 28 can be controlled by the operator via the control panel 9 of the road finisher 2 or of the charger 13. Alternatively or additionally, the linear drive 28 can also be operated on the lifting device 7 and/or controlled automatically.

Figure 7:
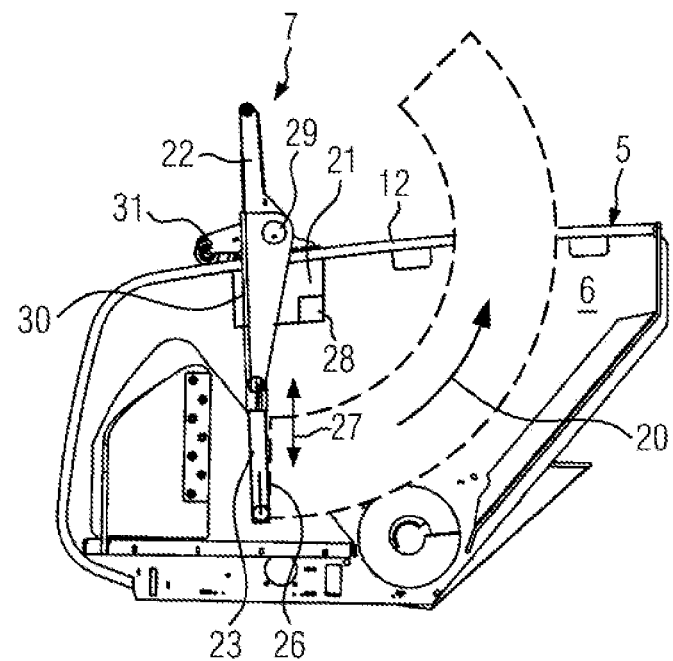
FIG. 7 is a side view of the material bunker arrangement according to the present disclosure comprising the lifting device.

FIG. 7 shows an enlarged side view of the interior of the material bunker 5. As in the case of FIGS. 5 and 6, the bearing unit 21 of the lifting device 7 is secured in position on an upper edge 12 of the material bunker 5. The telescopic arm 23 is guided within the pivot arm 22. The pivot arm 22 and the telescopic arm 23 may here be configured as a movable hydraulic or pneumatic piston-cylinder arrangement. As has been explained in connection with FIGS. 5 and 6, the telescopic arm 23 can be moved relative to the pivot arm 22 along the linear direction 27 between the extended and retracted positions 24, 25, making use of the linear drive 28. The pivot arm 22 is rotatably secured to a rotational axle 29, about which it is pivoted, so as to lift the tailgate 16 of the truck A out of the charging area 19 of the material bunker 5.

The bearing unit 21 comprises an inner as well as an outer guide plate 30, which is not shown, said inner and outer guide plates 30 being oriented on an inner side and an outer side of the side wall 6. Furthermore, the bearing unit 21 comprises a roller guide 3 which rests on the upper edge 12 of the side wall 6. The respective guide plates 30 and the roller guide 31 facilitate shifting of the lifting device 7 along the upper edge 12 of the side wall 6. Hence, the lifting device 7, which is preferably releasably secured in position, can be shifted along the upper edge 12 in an arbitrary manner.

Figure 8:
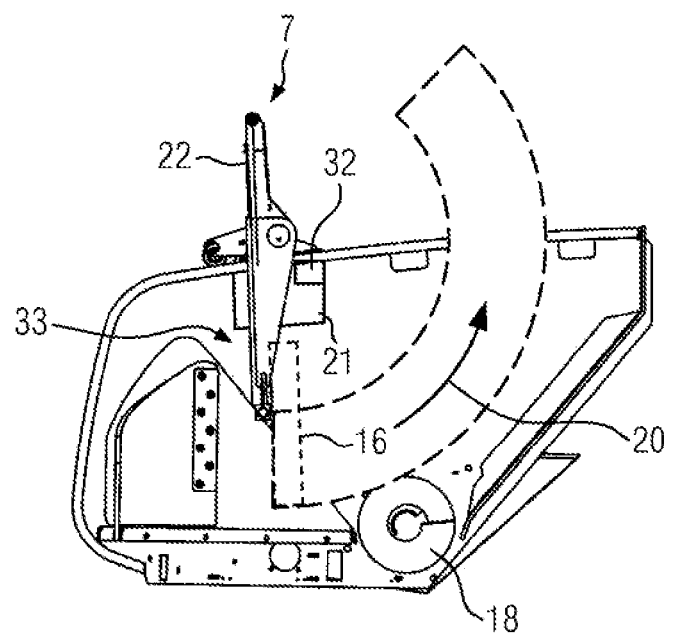
FIG. 8 is a side view of the interior of the material bunker arrangement according to the present disclosure, with the lifting device at a first pivoting position.

FIG. 8 shows that the lifting device 7 comprises a schematically represented pivot drive 32. The pivot drive 32 is provided for pivoting the pivot arm 22 relative to the bearing unit 21 along the pivoting direction 20, i.e., the pivot drive 32 is needed, when the telescopic arm 23, in particular the holding element 26 thereof, has docked onto the tailgate 16 of the truck A, for lifting the tail-gate 16 then along the pivoting direction 20 out of the charging area 19 of the material bunker, so that the tailgate 16 can no longer collide with the material bunker 5 and the components provided therein, e.g., the transverse auger 18 shown in FIG. 8.

Figure 9:
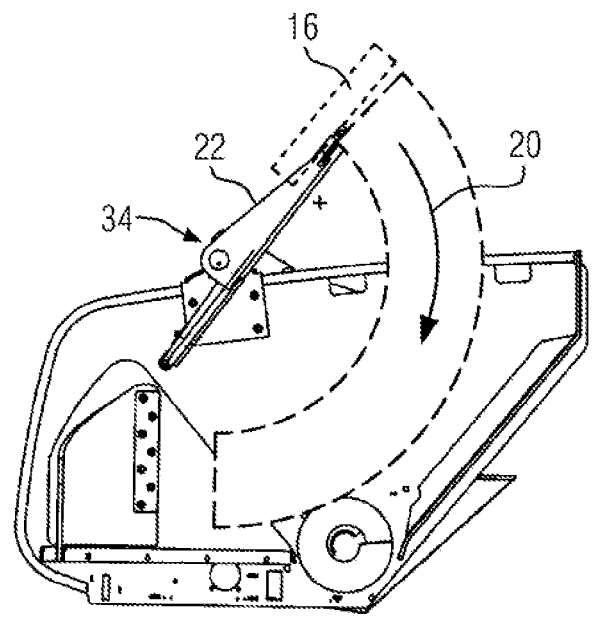
FIG. 9 is a side view of the interior of the material bunker arrangement according to the present disclosure, with the lifting device at a second pivoting position.

FIG. 8 shows the pivot arm 22 at a first pivoting position 33, and the tailgate 16 in dashed lines in a first position. From the first pivoting position 33, the pivot arm 22 is pivoted in FIG. 8 along the pivoting direction 20 to a second pivoting position 34, at which the lifting device 7 will lift the tailgate 16 of the truck A (cf. FIG. 4) preferably completely out of the charging area 19 of the material bunker 5. In FIG. 9, the lifting device 7 is located at the second pivoting position 34, and the tailgate 16 is shown in dashed lines in a second position. At the second pivoting position 34, the pivot arm 22 occupies a position offset by approx. 135° along the pivoting direction 20 relative to the first pivoting position 33. Thus, the tailgate 16 resting on the telescopic arm 23 can be held above the material bunker 5. The pivot arm 22 is preferably retained at the second pivoting position 34 until pavement material M no longer drops from the load platform 15 into the material bunker 5.

By controlling the pivot drive 32 automatically or manually, the pivot arm 22 can be returned from the second pivoting position 34 to the first pivoting position 33. This has the effect that the tailgate 16 will be returned to its substantially perpendicular orientation in a controlled movement. This may take place simultaneously with the return tilting movement of the load platform 15, without this being absolutely necessary.

Figure 10:
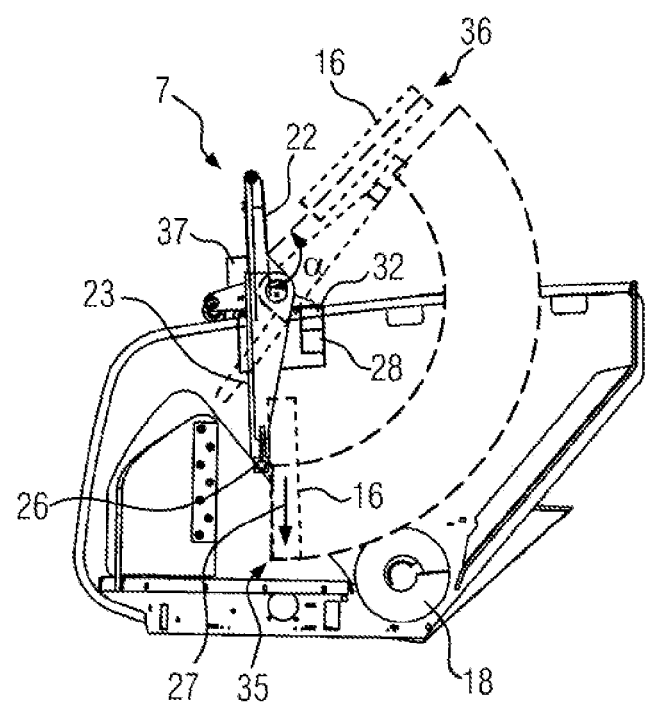
FIG. 10 is a side view of the interior of the material bunker arrangement according to the present disclosure, with the lifting device returning to the starting position.

FIG. 10 shows the lifting device 7 after the pivot arm 22 thereof has been returned from the second pivoting position 34 to the first pivoting position 33 by means of the pivot drive 32. The broken lines show schematically that the tailgate 16 of the truck A occupies again its starting position, viz. the first position 35. At the first position 35, the tailgate 16 is oriented substantially perpendicular to the ground U. At the second pivoting position 34, which has been described hereinbefore in connection with FIG. 9 and at which the pivot arm 22 has been pivoted along the pivoting direction 20 to a position outside the charging area 19, the tailgate 16 is supported at the second position 36. Between the first and second positions 35, 36, the tailgate 16 preferably pivots through a pivot angle α of up to 160°.

In FIG. 10 it can be seen that the holding element 26 of the telescopic arm 23 still abuts on the inner side of the tailgate 16, so that the truck A shown in FIG. 4 cannot yet leave. For releasing the tailgate 16, the telescopic arm 23 is moved by means of the linear drive 28 out of the pivot arm 22 and back to the extended position 24 described in connection with FIG. 5. At the extended position 24, the tailgate 16 is fully decoupled from the telescopic arm 23, so that the truck A in front of the road finisher 2 and the charger 13, respectively, can leave. In this respect, the lifting device 7 may be provided with a signaling unit 37, which is schematically outlined in FIG. 10, said signaling unit 37 being configured for transmitting to the operator of the road finisher 2 or of the charger 13, and in particular to the truck driver, an enabling signal indicating acoustically and/or visually that the truck A may leave.

Figure 11A:
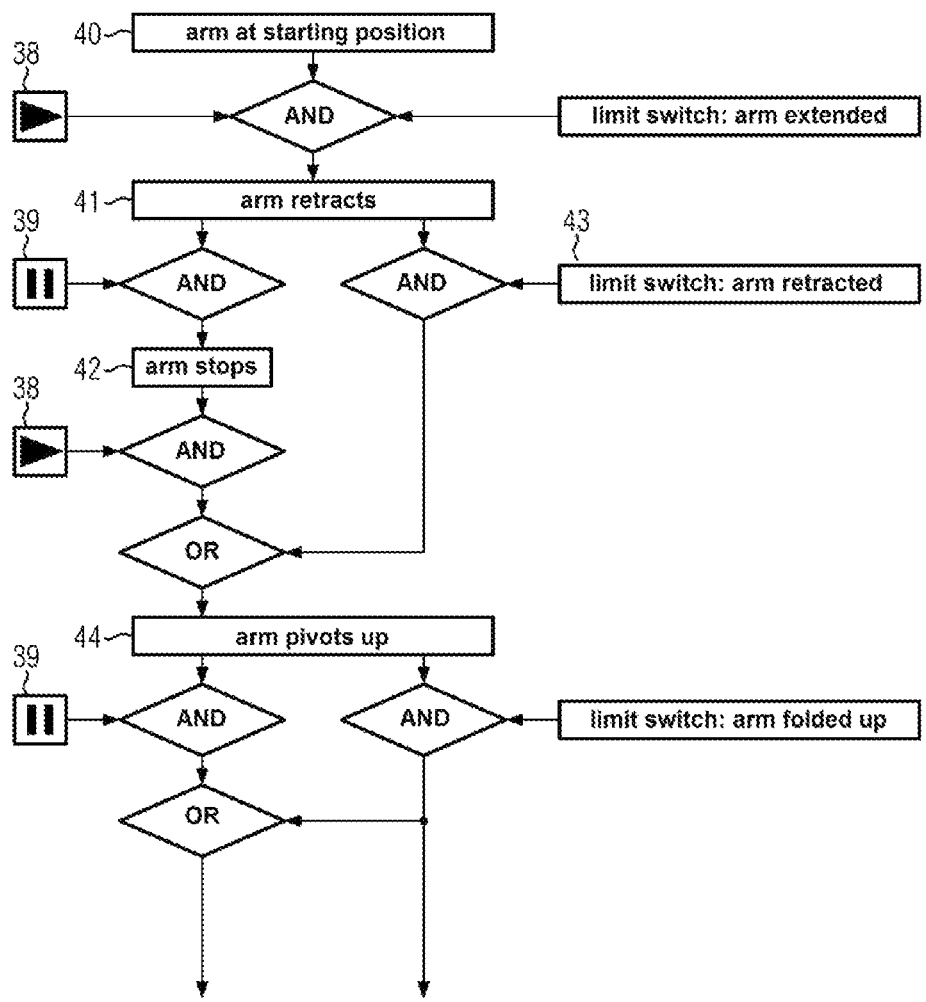
FIG. 11A is a motion flow chart of the lifting device used for the present disclosure.
Figure 11B:
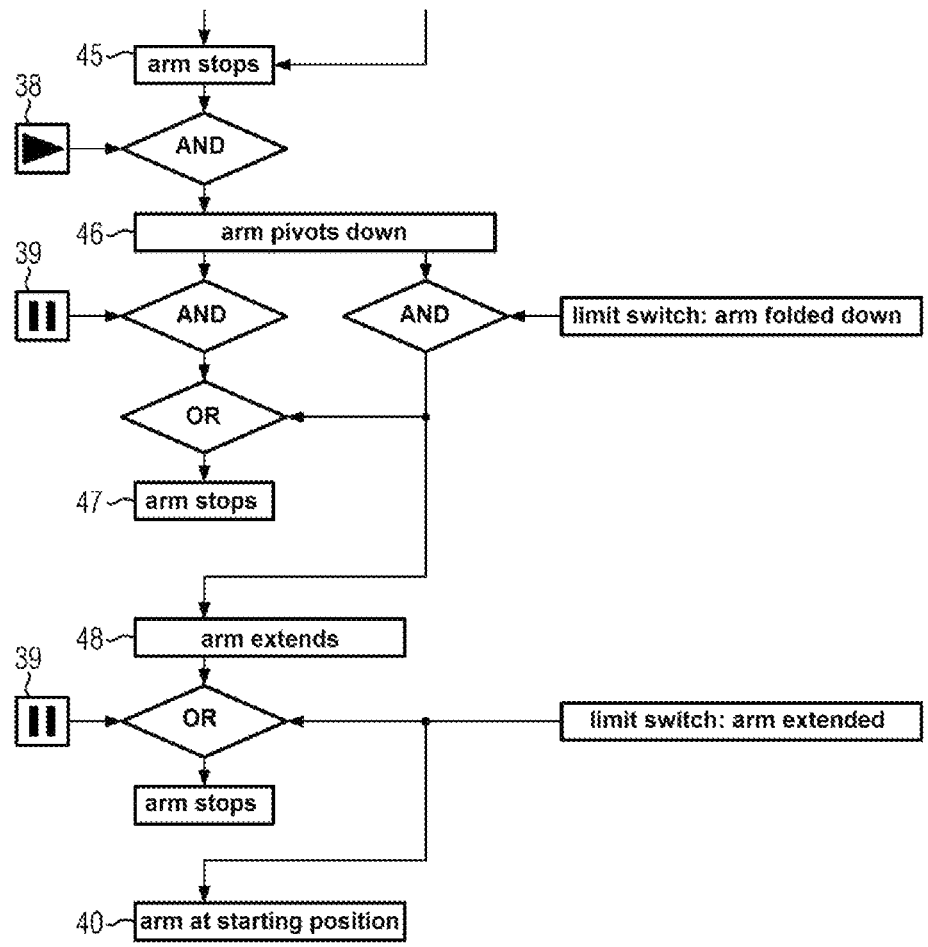
FIG. 11B is a continuation of the motion flow chart according to the present disclosure shown in FIG. 11A.

FIGS. 11A and 11B show a respective motion flow chart for at least one lifting device 7. The sequence of motions of the lifting device 7 can be executed by means of a start button 38 and a stop button 39. The sequence of motions for the lifting device 7 may preferably take place as follows hereinbelow; individual steps and also a plurality of steps may be omitted:

1. Initially, the lifting device is at a starting position 40 at which the pivot arm 22 is at the first pivoting position 33 and the telescopic arm 23 is at the extended position 24 (cf. FIG. 5).
2. If the start button 38 is pressed and if the telescopic arm 23 is at the extended position 24, the telescopic arm 23 will retract into the pivot arm 22 in the linear direction 27 (step 41). This is also shown in connection with FIG. 6.
3. The retraction of the telescopic arm 23 can be interrupted underway by means of the stop button 39. The telescopic arm 23 will then stop according to step 42. Alternatively, the telescopic arm 23 retracts into the pivot arm 22 until it has reached an end position therein.
4. If the start button 38 is activated again after the telescopic arm 23 has been stopped, the pivot arm 22 will pivot from the first pivoting position 33 in the pivoting direction 20 to the second pivoting position 34. Alternatively, the pivot arm 22 will automatically pivot to the second pivoting position 34, without the start button 38 being activated again, if it is detected (step 43) that the telescopic arm 23 is at the fully retracted position 25, where it actuates a limit switch, which automatically triggers the pivot drive 32. Both alternatives have the effect that the pivot arm 22 is pivoted upwards in the direction of the second pivoting position 34 (step 44).
5. The pivoting up of the pivot arm 22 along the pivoting direction 20 can (like the linear displacement of the telescopic arm 23 under 3.) be interrupted by means of the stop button 39, so as to lift the tailgate to be moved to an arbitrary position. Alternatively, the pivoting up of the pivot arm 22 will be stopped automatically, when the latter arrives at the second pivoting position 34. In the case of both alternatives, the pivot arm 22 will stop according to step 45.
6. The pivot arm 22 remains at the intermediately-stopped or second pivoting position 34 until pivoting down is initiated by means of the start button 38, whereby the pivot arm 22 will pivot from the intermediately-stopped or second pivoting position 34 back to the first pivoting position 33 according to step 46. Just as the pivoting up of the pivot arm 22 also the pivoting down in the direction of the first pivoting position 33 can be interrupted at an arbitrary point by means of the stop button 39. Alternatively, the pivoting down of the pivot arm 22 will be stopped automatically, when said pivot arm 22 has fully returned to the first pivoting position 33. Hence, the pivot arm 22 stops either at a desired position through pressing of the stop button 39 or at the first pivoting position 33 (step 46).
7. As soon as the pivot arm 22 has returned to the first pivoting position 33, the telescopic arm 23 moves out of the pivot arm 22 according to step 48. This has the effect that the lifting device 7 will release the tailgate 16 of the truck A. The telescopic arm 23 will then return to the extended position 24 (cf. FIG. 5). The extension of the telescopic arm 23 can be interrupted by means of the stop button 39 or it can be stopped automatically, when the telescopic arm 23 reaches the extended position 24.
8. The lifting device 7 is now again at its starting position 40.

9. The stopping and turning points passed during the sequence of motions of the lifting device 7 can be learned by the control device 45 and retrieved, if necessary. When the sequence of motions of the lifting device 7 has been carried out, it can be stored by the control device 45 of the road finisher or of the charger. This can preferably be done by pushing a button, in particular through the start button 38 and/or the stop button 39. Alternatively, the sequence of motions may also be stored by pressing a storage key provided at the operator's stand 8. As another alternative, storage may take place automatically, a storage and/or retrieving process being in this case preferably triggered through docking of the truck onto the road finisher or the charger.

The above described operating sequence of the lifting device may, alternatively, also take place fully automatically, in particular such that it is functionally coupled to the pushing device 11 of the road finisher 2 or of the charger 13. To this end, the linear drive 28 as well as the pivot drive 32 may be controlled via a signal line between the lifting device 7 and the pushing device 11. An additional intervention on the part of an operator by means of key depression is then no longer necessary. In particular, the automatic operation of the lifting device 7 may be subjected to the storage process described above under 9.

In the above described embodiments, the lifting device 7 has been described as an independent unit, which is adapted to be releasably secured to the material bunker 5. However, it would also be possible to configure the lifting device 7 such that it is integrated in the material bunker, in particular in the side wall 6 of the latter. It would e.g., be imaginable that the complete bearing unit 21 is arranged within the side wall 6, said side wall 6 defining a suitable accommodation cavity for this purpose. In the case of such a solution, only the pivot arm 22 and the telescopic arm 23 coupled thereto would still be visible in the material bunker 5.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A building machine comprising:
   a material bunker for accommodating therein pavement material to be laid; and
   a lifting device associated with the material bunker and adapted to enter into releasable engagement with a movable tailgate of a truck that supplies the material bunker with the pavement material, the lifting device being configured for displacing the movable tailgate of the truck between a first position and a second position;
   wherein the building machine is a road finisher or a charger.

2. The building machine according to claim 1 wherein the lifting device comprises a linear drive configured for bringing the lifting device into engagement with the movable tailgate of the truck as well as for releasing the lifting device from the movable tailgate.

3. The building machine according to claim 1 wherein the lifting device comprises a pivot drive configured for pivoting the movable tailgate of the truck between the first position and the second position.

4. The building machine according to claim 1 wherein the lifting device is adapted to be operated electrically, hydraulically, pneumatically and/or mechanically for taking hold of and/or displacing the tailgate of the truck.

5. The building machine according to claim 1 wherein the lifting device is controllable automatically and/or manually.

6. The building machine according to claim 1 wherein the lifting device is controllable automatically, and wherein a learned, previously stored sequence of motions for the lifting device can be retrieved.

7. The building machine according to claim 1 wherein the lifting device comprises a bearing unit, a pivot arm rotatably secured to the bearing unit and a telescopic arm, which is secured to the pivot arm such that the telescopic arm is displaceable between an extended position and a retracted position.

8. The building machine according to claim 7 wherein the telescopic arm comprises at its extendable end a holding element for coupling to the tailgate.

9. The building machine according to claim 1 wherein the lifting device is secured on an upper edge of a side wall of the material bunker.

10. The building machine according to claim 1 wherein the material bunker comprises two side walls and the building machine comprises two of the lifting devices, and wherein each lifting device is secured to a respective side wall.

11. The building machine according to claim 1 wherein the lifting device is releasably secured to the material bunker.

12. The building machine according to claim 1 wherein the lifting device is configured for holding the tailgate outside a charging area of the material bunker, when the tailgate is in the second position.

13. The building machine according to claim 1 wherein the lifting device is integrated in the material bunker.

14. A method of shifting a movable tailgate of a truck that supplies paving material to a material bunker of a road finisher or of a charger, the method comprising:
    docking a lifting device, which is provided on the material bunker, onto the tailgate of the truck when the tailgate is in a first position;
    moving, by the lifting device, the tailgate from the first position to a second position at which the tailgate has, at least partially, been moved out of a charging area of the material bunker; and
    holding, by the lifting device, the tailgate at the second position at least temporarily.

15. The method according to claim 14 further comprising moving, by the lifting device, the tailgate from the second position back to the first position.

16. The method according to claim 14 wherein the lifting device is displaced by means of a linear drive for docking onto the tailgate of the truck.

17. The method according to claim 14 wherein the lifting device is displaced by means of a pivot drive for moving the tailgate between the first position and the second position.

* * * * *